W. J. BERGENS.
UNIVERSAL FAUCET.
APPLICATION FILED AUG. 20, 1917.
1,268,316.
Patented June 4, 1918.
2 SHEETS—SHEET 2.
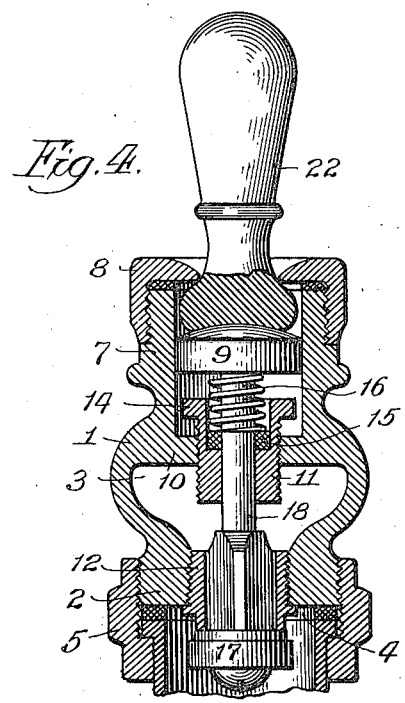
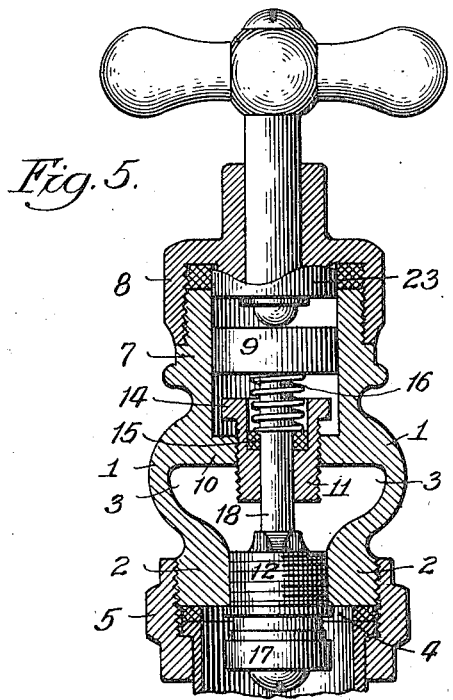
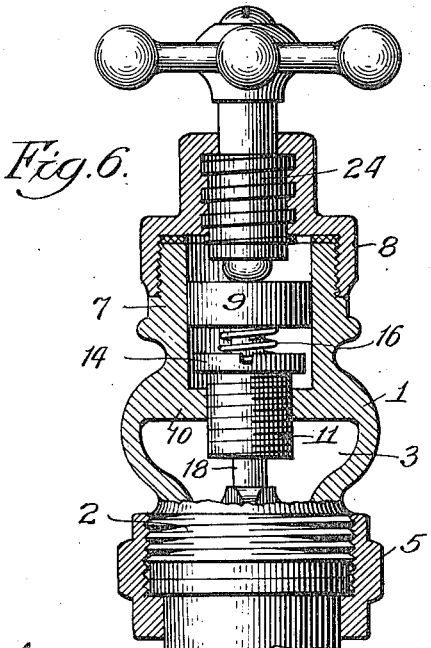
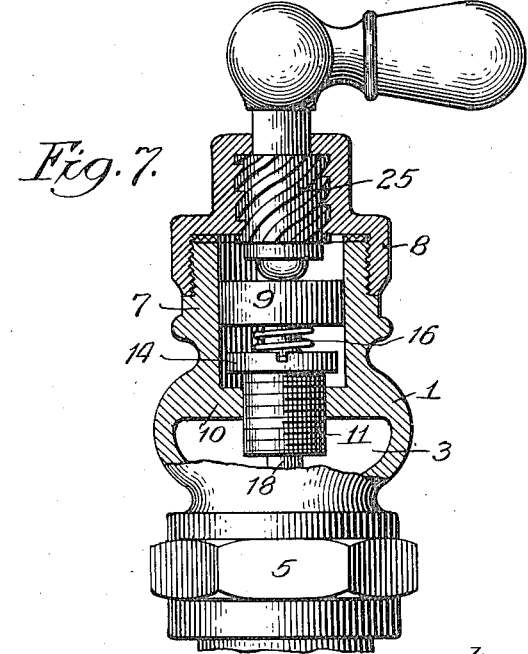
Witness:
John Enders
Inventor:
William J. Bergens,
by Robert Burns,
Atty.

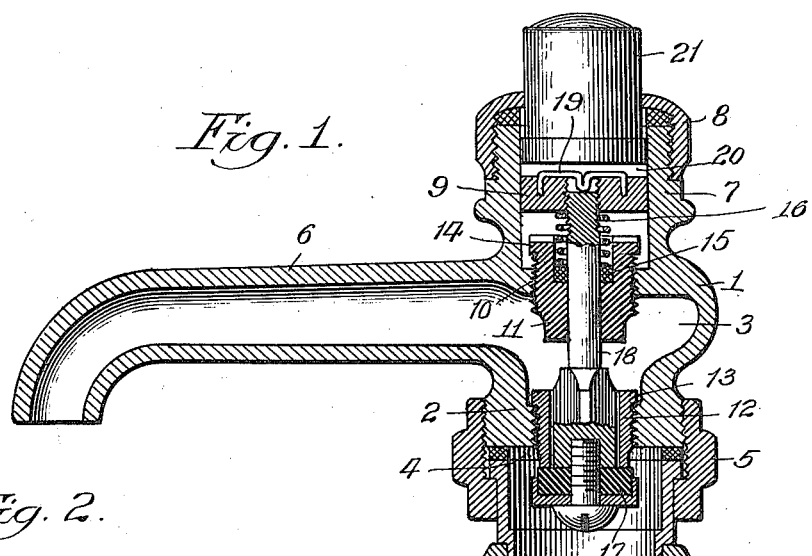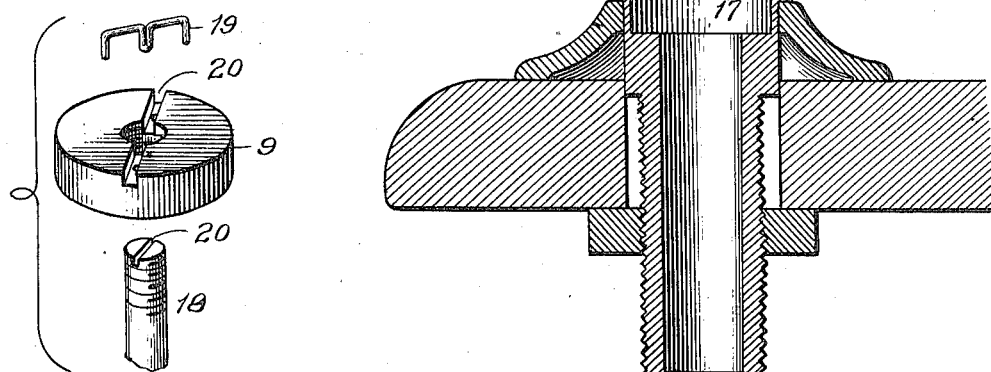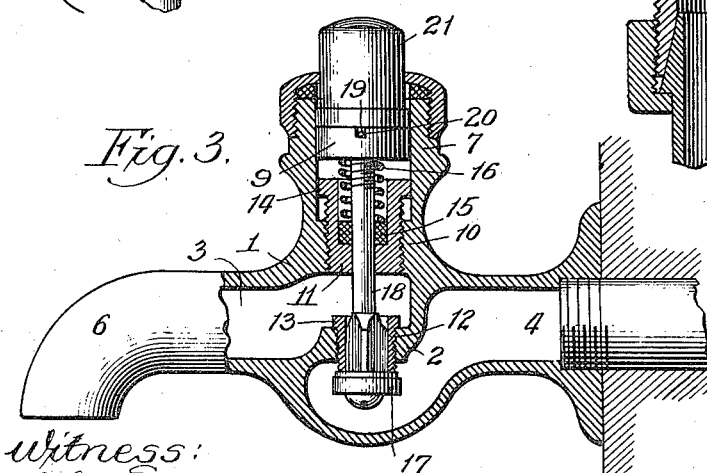

UNITED STATES PATENT OFFICE.

WILLIAM J. BERGENS, OF MUSKEGON, MICHIGAN, ASSIGNOR TO UNIVERSAL FAUCET COMPANY, OF MUSKEGON, MICHIGAN, A CORPORATION OF MICHIGAN.

UNIVERSAL FAUCET.

1,268,316.     Specification of Letters Patent.     Patented June 4, 1918.

Application filed August 20, 1917. Serial No. 187.299.

*To all whom it may concern:*

Be it known that I, WILLIAM J. BERGENS, a citizen of the United States of America, and a resident of Muskegon, in the county of Muskegon, State of Michigan, have invented certain new and useful Improvements in Universal Faucets, of which the following is a specification.

This invention relates to that form of faucets in which the closing movement of the movable valve member or head is in the direction of the fluid through the faucet, and has for its various objects:—

To provide a structural formation and association of parts adapted for use, without alteration or refitting, in connection with various operating means such as the oscillating handle, slow-thread, quick-thread, cam or push-button, commonly employed in plumbers' faucets. And with which the parts entering into the internal structure of the faucet can be readily standardized so as to be interchangeable in the various styles and types of faucets to which the invention is applied, the valve seat of the structure being capable of removal and replacement through the front or top opening of the faucet casing, thus enabling the ready application of the invention to that form of concealed faucets in which all but the stuffing nut and operating handle are arranged out of view.

To provide a structure in which the movable valve member closes with the pressure, and in which a spring employed to maintain a packing ring in place around the valve stem is also adapted to move the movable valve member to a closed position in the absence of fluid pressure, and with which the parts in assembled relation are adapted to maintain the operating means or handle in proper operative position regardless of subsequent wear of the valve head in long continued use.

To provide a structure wherein an adjustment of parts to compensate for wear of the seat washer of the movable valve member can be attained without requiring the water pressure being shut-off during the operation, the formation also providing means whereby the area of the passage next adjacent to the valve seat orifice can be adjusted and varied to regulate the flow of fluid, with an avoidance of a separate regulating cock in the water supply pipe usually employed in connection with water faucets. All of which objects will hereinafter more fully appear.

In the accompanying drawings:—

Figure 1 is a central longitudinal section of a basin faucet embodying the present invention.

Fig. 2, is a detail perspective view of the free end of the valve stem, its adjustable nut and the locking means between said members, the parts being shown in a detached condition.

Fig. 3, is a central longitudinal sectional elevation illustrating the invention applied to a wall faucet.

Fig. 4, is a detail section of a modification and illustrating the invention in connection with an oscillating lever as the operating means.

Fig. 5, is a detail section illustrating the invention in connection with a rotary cam as the operating means.

Fig. 6, is a similar view illustrating the invention in connection with a slow-screw as the operating means.

Fig. 7, is a similar view illustrating the invention in connection with a quick-screw as the operating means.

Like reference numerals indicate like parts in the several views.

Referring to the drawings, 1 designates the faucet casing of any usual external configuration and having the usual transverse partition 2 providing a carrying means for the valve seat of the faucet. A lower inlet chamber 4 may be formed by the union-coupling 5 and the water supply pipe, as shown in Fig. 1, or said chamber 4 may be formed wholly in the casing 1, as shown in Fig. 3, both constructions being common in plumbers' faucets and the like.

6 designates the usual outlet nozzle of the casing 1, and having communication with the outlet chamber 3 thereof.

7 designates a guide neck on the faucet casing 1, formed with a cylindrical guide bore, open at its upper end, and closed by the usual cap nut or gland 8. The aforesaid guide bore is adapted to receive and guide the hereinafter described guide head 9 of the valve stem of the faucet, and said bore is separated from the outlet chamber 3 by a partition 10 formed with a central screw-threaded orifice which receives the adjustable bushing 11 hereinafter described.

12 designates the valve seat of the faucet, and which in the present improvement is formed by a screw-threaded bushing which screws into a central screw-threaded orifice in the transverse partition 2 aforesaid. Said bushing is provided with a stop flange 13 adapted to properly position the valve seat or bushing 12 in the assemblage of the parts. The stop flange 13 is preferably arranged at the upper end of said bushing as shown in Figs. 2 and 3, so that the bushing can be removed and replaced through the bore of the guide neck 7 aforesaid, without necessitating a detachment of the faucet casing 1 from the water supply pipe, the arrangement having merit in the concealed type of water faucets now in general use.

The adjustable bushing 11 above referred to, is externally screw-threaded and is adapted for adjustment in the screw-threaded orifice of the partition 10 in a direction to and from the valve seat or bushing 12, so as to vary the area of the water passage between the parts and thus regulate the flow of water through the faucet and avoid the usual "pounding" due to sudden checking of the flow of water from the faucet. Said bushing 11 is provided at its upper end with a marginal flange 14, or other like provision, by means of which it may be turned to effect an adjustment, and in addition said bushing is formed with a central open top cavity adapted to receive an annular packing or washer 15 surrounding the stem of the movable valve member hereinafter described, and adapted to prevent leakage along the same.

16 designates a spring surrounding the valve stem above referred to, and having abutment at one end against the washer 15, and at the other end against the guide head 9 aforesaid. The resiliency of said spring 16 is adapted to maintain the washer 15 in place.

17 designates the movable valve member or head of any usual and suitable construction, arranged beneath the valve seat or bushing 12 aforesaid, and adapted to close against the same in the direction of the flow of fluid through the faucet. The valve member or head 17 is provided with a valve stem 18 the upper end of which is screw-threaded for engagement with the adjustable guide head 9 above referred to. Said guide head 9 is adjustable on said stem, and is locked at the required adjustment by a spring pin 19 engaging in transverse grooves 20 in the parts as shown, or by other ordinary means adapted to prevent independent turning movement between the parts. The said guide head 9 in a closed condition of the valve head 17, has abutting engagement with the manually actuated operating means of the faucet and is operated thereby and in turn imparts an opening movement to the valve head 17.

In Figs. 1 and 3, a push button or plug 21, is shown as the operating means above referred to. In Fig. 4, an oscillating handle 22 is shown as the operating means. In Fig. 5, a handled cam disk, 23, constitutes the operating means. In Fig. 6, a handled slow-pitch screw plug 24, is shown as the operating means, while in Fig. 7, a handled quick-pitch screw plug 25 constitutes such means.

Having thus fully described my said invention, what I claim as new and desire to secure by Letters Patent, is:—

1. In a faucet of the type described, the combination of a casing having an outlet chamber a wall of which is formed with a central orifice, a valve seat or bushing fitted in said orifice and removable through the outlet chamber, a valve head closing against the underside of said valve seat and having a valve stem extending through the outlet chamber, an adjustable head having screw-threaded connection with one end of said valve stem and provided with a diametric groove in its upper end, a spring locking pin arranged in said groove, the end of the valve stem having a transverse groove for engagement with said pin, and manually actuated means engaging said head and adapted to effect an opening movement of said valve head, substantially as set forth.

2. In a faucet of the type described, the combination of a casing having an outlet chamber and a guide neck formed with a cylindrical guide bore ending at its lower end with a screw-threaded orifice communicating with the outlet chamber aforesaid, a wall of the outlet chamber having a central orifice, a bushing fitted in said central orifice, a valve head closing against the underside of said bushing and having a valve stem extending through the outlet chamber and into the guide neck aforesaid, manually actuated means for imparting an opening movement to the valve head, and an adjustable bushing screwed into the screw-threaded orifice of the aforesaid cylindrical bore and adapted to vary the area of the outlet space adjacent to the valve seat, substantially as set forth.

3. In a faucet of the type described, the combination of a casing having an outlet chamber and a guide neck formed with a cylindrical guide bore ending at its lower end with a screw-threaded orifice communicating with the outlet chamber aforesaid, a wall of the outlet chamber having a central orifice, a bushing fitted in said central orifice, a valve head closing against the underside of said bushing and having a valve stem extending through the outlet chamber and into the guide neck aforesaid, manually actuated means for imparting an opening movement to the valve head, an adjustable bushing fitting the screw-threaded orifice of the aforesaid cylindrical bore and having an open top cavity in its upper end, and a packing washer disposed in said cavity and surrounding the valve stem, substantially as set forth.

4. In a faucet of the type described, the combination of a casing having an outlet chamber and a guide neck formed with a cylindrical guide bore ending at its lower end with a screw-threaded orifice communicating with the outlet chamber aforesaid, a wall of the outlet chamber having a central orifice, a bushing fitted in said central orifice, a valve head closing against the underside of said bushing and having a valve stem extending through the outlet chamber and into the guide neck aforesaid, manually actuated means for imparting an opening movement to the valve head, an adjustable bushing fittting the screw-threaded orifice of the aforesaid cylindrical bore and having an open top cavity in its upper end, a packing washer deposed in said cavity and surrounding the valve stem and a spring adapted to hold said washer in place, substantially as set forth.

Signed at Chicago, Illinois, this 15th day of August, 1917.

WILLIAM J. BERGENS.